United States Patent [19]
Palmer et al.

[11] 3,833,328
[45] Sept. 3, 1974

[54] MACHINE FOR MANUFACTURING DISC RECORDS

[76] Inventors: Leonard Palmer, 22 Lakeview Ave., Elizabeth, N.J. 07932; Joseph Flusfeder, 801 N. Broad St., Elizabeth, N.J. 07201

[22] Filed: Nov. 24, 1972

[21] Appl. No.: 309,588

[52] U.S. Cl. ............... 425/308, 425/116, 425/810
[51] Int. Cl. ............................................. B29d 17/00
[58] Field of Search ......... 425/109, 112, 116, 135, 425/810, 123, 139, 215, 128, 308, 292

[56] References Cited
UNITED STATES PATENTS

| | | | |
|---|---|---|---|
| 2,743,478 | 5/1956 | Harlow et al. | 425/109 |
| 3,329,997 | 7/1967 | Rand et al. | 425/112 |
| 3,412,427 | 11/1968 | Flusfeder et al. | 425/109 |
| 3,526,690 | 9/1970 | Bachman | 425/135 X |
| 3,528,127 | 9/1970 | Damon et al. | 425/116 |
| 3,662,051 | 5/1972 | Harlow et al. | 425/109 X |
| 3,663,136 | 5/1972 | Westermann | 425/116 |

Primary Examiner—J. Howard Flint, Jr.
Attorney, Agent, or Firm—Blum Moscovitz Friedman & Kaplan

[57] ABSTRACT

A machine for manufacturing disc records. The machine has a molding station where records are molded, a trimming station where flash is trimmed from the molded records, and a receiving station where finished records are received. A transfer assembly simultaneously transfers the molded records from the molding station to the trimming station and the finished records from the trimming station to the receiving station. At the receiving station envelopes are automatically situated in a condition for receiving the finished records so that the finished records are automatically placed in envelopes.

10 Claims, 12 Drawing Figures

MACHINE FOR MANUFACTURING DISC RECORDS

BACKGROUND OF THE INVENTION

The present invention relates to machines for manufacturing records.

Although machines of this type are generally known, they are relatively complex and expensive, and the number of operations they must perform and the time required for the performance of these operations are undesirably large. Considerable complications are involved in connection with trimming flash from a molded record and in then placing the finished record in an envelope. Because of the complexities involved particularly in the latter phases of the manufacture of disc records with conventional machines, the costs of the records are undesirably high.

SUMMARY OF THE INVENTION

It is accordingly a primary object of the present invention to provide a machine which will avoid the above drawbacks.

In particular, it is an object of the present invention to provide a machine which will greatly simplify the operations involved in connection with trimming of flash from records and placing the records in envelopes.

A further object of the present invention is to provide a machine which will not only simplify operations of the above type but which in addition will have a much higher output than conventional machines so that far more records can be treated in a given time than has heretofore been possible.

Yet another object of the present invention is to provide a machine of the above type which is constructed of relatively simple elements which operate in a highly reliable manner to achieve the desired results so that the initial costs of the machine of the invention and the costs involved in maintenance and operating the machine are all relatively low.

According to the invention the machine has a molding means located at a molding station, a trimming means located at a trimming station, and a receiving means located at a receiving station. A single transfer means is provided for simultaneously transferring molded records from the molding station to the trimming station and trimmed records from the trimming station to the receiving station.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
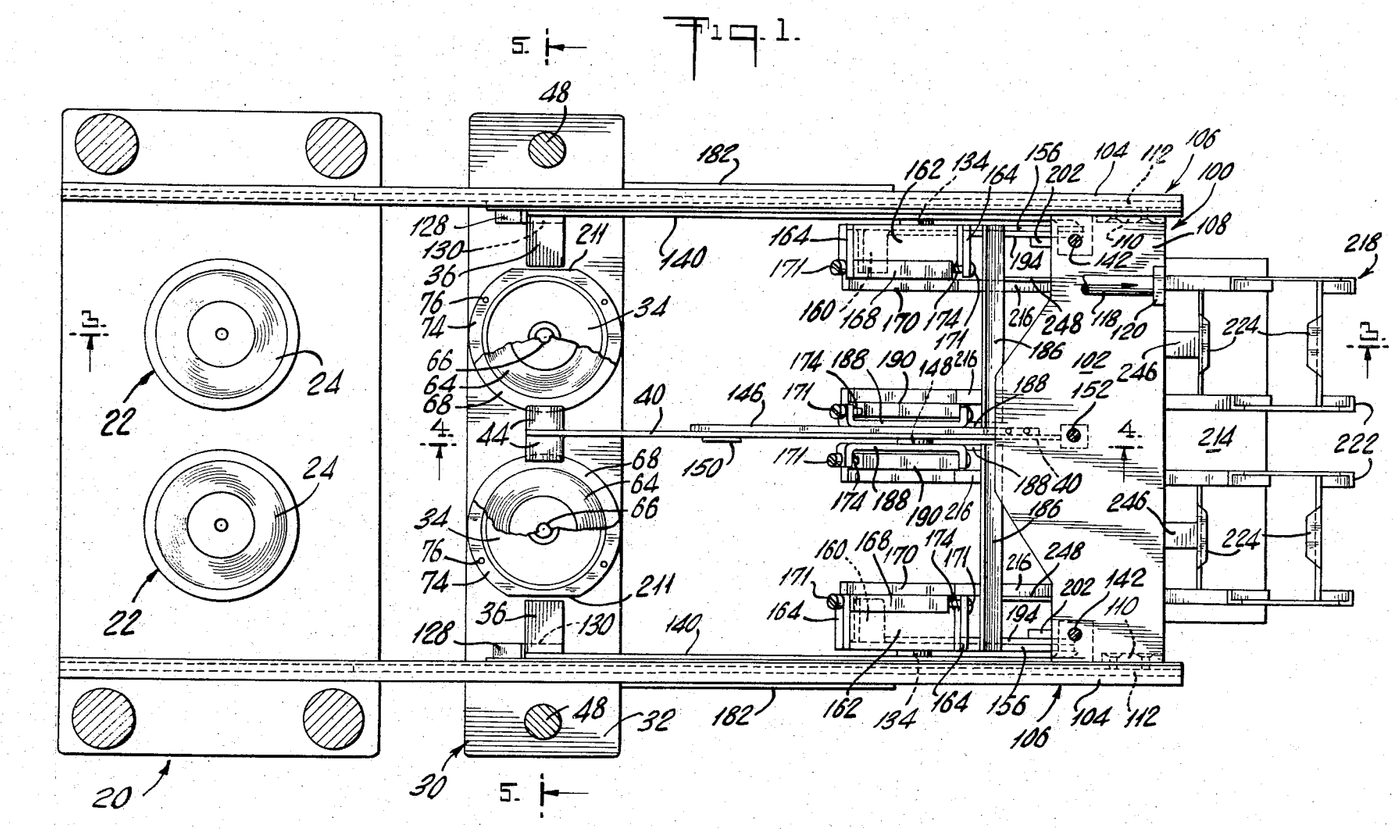
FIG. 1 is a partly sectional top plan view of one embodiment of a machine according to the invention.

Referring first to FIG. 1, there is illustrated therein in a plan view that part of a record manufacturing machine to which the present invention relates. Thus there is shown at the left of FIG. 1 a molding station 20 where a pair of molding means 22 are illustrated. With the illustrated embodiment of the invention a pair of records are simultaneously molded at the molding station 20 by the pair of molding means 22. In FIG. 1 there are shown the lower pair of movable molding dies 24 which cooperate with the stationary upper molding dies 26 of the molding means. Thus, as may be seen from FIG. 3 where one of the lower molding dies 24 is shown, the pair of lower molding dies are carried by a vertically movable head 28 capable of being moved downwardly and then upwardly in any suitable way which does not form part of the present invention. When the head 28 moves up, a pair of cakes previously deposited in a manner which does not form part of the present invention on the lower dies 24 are molded between the upper dies 26 and the lower dies 24, so that in this way the desired records are manufactured. These records as molded at the molding station 20 will have central openings. The labels have already been applied in a known way to the opposite faces of the molding cakes which are deposited on the lower dies 24. When the lower dies 24 move downwardly with the head 28 back to the starting position shown in FIG. 3, the molded records are held by a transfer means described below, the flash projecting from the peripheries of the molded records being grasped by a first flash-engaging means of the transfer means described below for the purpose of transferring the molded records to a trimming station.

The trimming station 30 is illustrated in FIG. 1 to the right of the molding station 20. At the trimming station 30 a pair of previously molded records have the flash trimmed therefrom. For this purpose, as shown in FIG.

Figure 5:
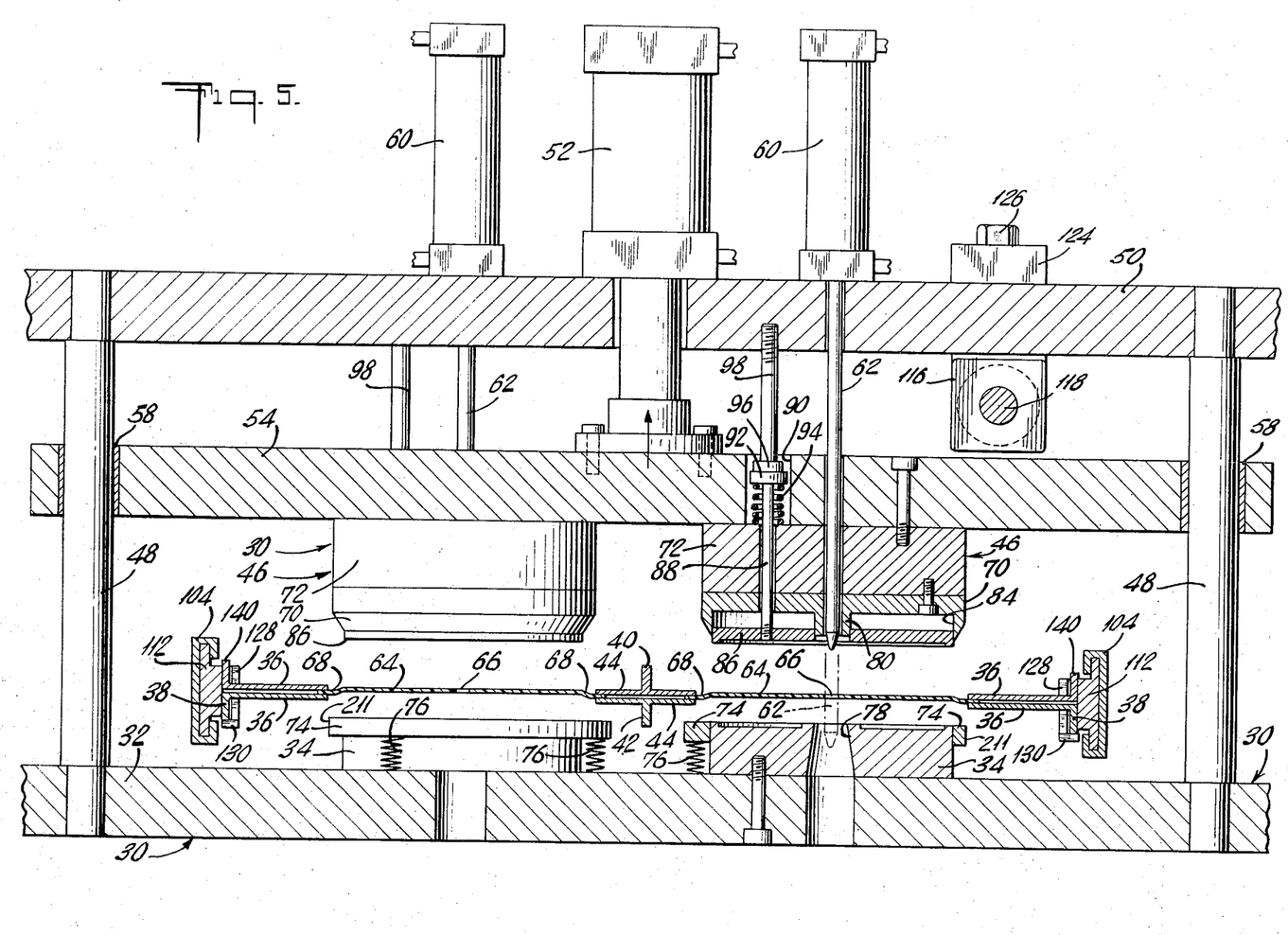
FIG. 5 is a transverse sectional elevation taken along line 5—5 of FIG. 1 in the direction of the arrows illustrating the structure at the trimming station.

5, the trimming station includes a lower base 32 carrying a pair of lower circular supports 34 on which the records to be trimmed are deposited after being transferred to the trimming station 30 by the transfer means which is described in greater detail below. FIG. 5 illustrates how the first flash-engaging means is formed by the gripping portions 36 of levers 38 of the transfer means which grip the flash of the previously molded records at outer regions thereof, while an intermediate pair of levers 40 and 42, described in greater detail below, have gripping portions 44 which grip the flash at the inner regions of the records so that in this way the records are supported by the transfer means during transfer of the records from the molding station to the trimming station shown in FIG. 5. In a manner which is described in greater detail below, the levers 38 on the one hand and the levers 40 and 42 on the other hand are actuated so as to release the records which become deposited on the supports 34.

The details of both of the trimming means 46 shown in FIG. 5 are identical so that only the right trimming means is described. The left trimming means of FIG. 5 is constructed in the same way and operates in the same way. Thus it will be seen that the base 32 carries posts 48 which support a beam 50 at the top ends of the posts 48. The beam 50 supports a fluid-pressure means 52 operatively connected with a movable beam 54 which carries the pair of trimming means 46 so as to move the latter first downwardly and then upwardly, the beam 54 having sleeves 58 through which the posts 48 slidably extend so that the beam 54 and the pair of trimming means 46 carried thereby are suitably guided for downward movement along a trimming stroke and then for return movement to the rest position shown in FIG. 5.

The beam 50 also carries a pair of fluid-pressure means 60 operatively connected with pilot pins 62, respectively. The fluid-pressure means 60 as well as the fluid-pressure means 52 may be in the form of suitable cylinders having therein pistons which can be displaced by a fluid under pressure such as oil or the like, and it will be understood that through suitable valves which are actuated in a known way in a given sequence the structure shown operates in the manner described.

The cakes which are molded at the molding station 20 have central openings which remain in the molded records which are removed from the molding station by the transfer means, and these central openings are adapted to receive the pilot pins 62 illustrated in FIG. 5. Thus, while the records 64 are in the position illustrated in FIG. 5, the pair of fluid-pressure means 60 are actuated to longitudinally move the pilot pins 62 downwardly through the central openings 66 of the records 64, and thus when the transfer means releases the records 64 they will be guided for downward movement onto punch die supports 34 by the pilot pins 62 which have already reached the lower position shown in dot-dash lines for the right pin 62 in FIG. 5.

Then the beam 54 is lowered by actuation of the fluid-pressure means 52, with the result that the pair of trimming means 46 operate to trim the flash 68 from the peripheries of the records 64. For this purpose each trimming means 46 includes a circular cutting die 70 fixed to a supporting block 72 which is in turn fixed to the beam 54. The outer cutting edge 70 of the trimming die shears the flash from the periphery of each record 64 during downward movement of the trimming means 46 together with the beam 54. As the die 70 trims the flash from the record, the flash is pushed downwardly along the exterior of the punch die support 34, and these supports 34 are respectively surrounded by rings 74 which are urged upwardly by springs 76 so that these rings 74 normally have the elevation shown in FIG. 5.

It will be noted that each punch die support 34 is formed with a central bore 78 which flares in a downward direction so that each bore 78 has the tapered configuration shown for the right support 34 in FIG. 5. The die 70 has a central cylindrical punching portion 80 which enters into the opening 78 for punching from the center of each record a portion thereof which will provide each record with a central opening large enough to receive the central post on the turntable of a record player. Thus, with this particular construction the structure is adapted to manufacture records which are to be rotated at a speed of 45 RPM, these records customarily having relatively large central openings. Of course if records of a different size are to be manufactured the central punch 80 will be omitted. The tapered configuration of the opening 78 formed in the support 34 enables the punched out central portions of the records to fall through the support 34 and through openings 82 in the base 32 so that this punched out material can be collected below the base 32.

With the above-described trimming means 36, the outer peripheries of the trimmed records will frictionally engage the inner cylindrical surface 84 of each trimming die 70 so that the trimmed records will be raised with the pair of trimming means 46 when the latter move upwardly with the beam 54 during the return stroke of the trimming means. The hollow interior of each die 70 houses an ejecting means 86 in the form of a plate having an outer periphery slidably engaging the inner surface 84, this plate being formed with a central opening for the central punching die 80. Each plate 86 is fixed to a vertical rod 88 which extends through aligned bores formed in the die 70 and the block 72, and the top end portion of each rod 88 extends into a bore 90 which is formed in the beam 54. At its top end each rod 88 carries an enlarged head 92 which if desired may be formed integrally with the rod 88. Between the head 92 and the top surface of the block 72 within the bore 90, is a spring 94 engaging the lower surface of the head 92 so as to urge the rod 88 upwardly. The head 92 engages at its top surface the lower surface of a head 96 situated at the bottom end of a rod 98 which is threaded into a bore in the lower surface of the beam 50, as shown in FIG. 5. Thus, the head 96 can be received in the bore 90 in the manner shown in FIG. 5.

Thus, with this construction when the beam 54 is lowered from the position shown in FIG. 5, the spring 94 will expand to raise the ejecting means 86 upwardly into the interior 84 of the die 70 and the latter will proceed to trim the flash in one downward stroke of the trimming means 46 while simultaneously the central punch 80 will punch a central portion of the record as described above. Then during the return stroke the record remains in the interior of the die 70 as described above. However, as the beam 54 approaches the elevation shown in FIG. 5 the head 92 engages the stationary head 96 with the result that the ejecting means 86 does not accompany the beam 54 and the die 70 during the last portion of the upward movement thereof. The result is that the spring 94 becomes compressed while the die 70 moves upwardly with respect to the now stationary ejecting plate 86, and of course the result is that the record previously in the hollow interior 84 of the die 70 below the plate 86 remains in engagement with the lower surface thereof until the die 70 moves upwardly beyond the lower edge of the ejecting plate 86, thus resulting in dropping of the record onto platforms of the transfer means, as described in greater detail below.

Figures 2, 6, 7:
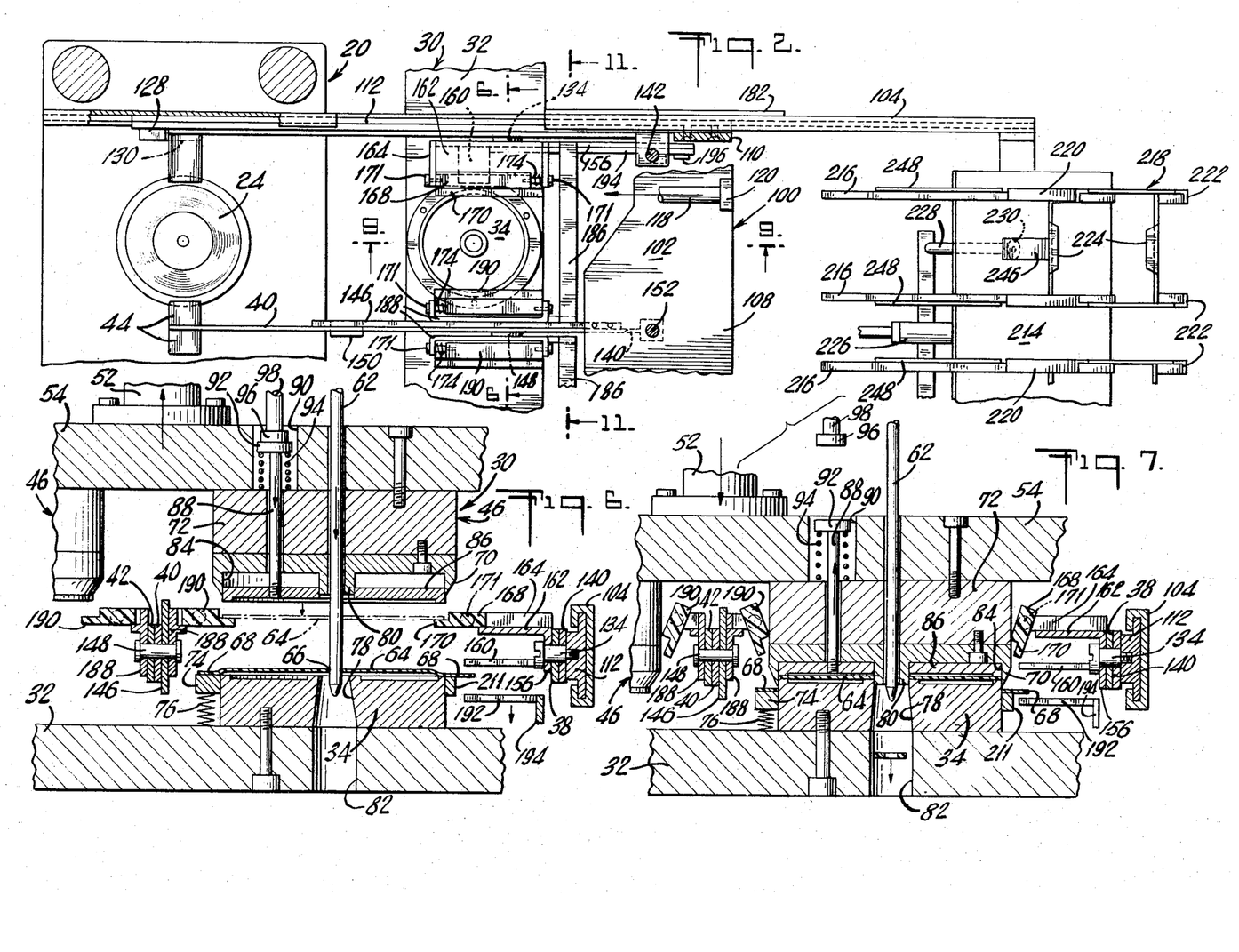
FIG. 2 is a fragmentary plan view of part of the structure of FIG. 1 showing a transfer means of FIG. 1 in a position different from that of FIG. 1.
FIG. 6 is a fragmentary sectional elevation taken along line 6—6 of FIG. 2 in the direction of the arrows and showing further details of structure at the trimming station.
FIG. 7 is a fragmentary sectional elevation showing the structure of FIG. 6 in a position different from that illustrated in FIG. 6.

The transfer means 100 of the present invention moves to the right from the position shown in FIG. 2 to the position shown in FIG. 1 during simultaneous transfer of molded records from the molding station 20 to the trimming station 30 and then in an opposite direction along a return stroke from the position of FIG. 1 into the position of FIG. 2. The transfer means 100 includes a carriage 102 which extends between guide rails 104 of a guide means 106 which serves to guide the transfer means 100 along a working stroke to the right from the position of FIG. 2 into the position of FIG. 1 and then along a return stroke to the left from the position of FIG. 1 to the position of FIG. 2.

Figures 8, 9, 10:
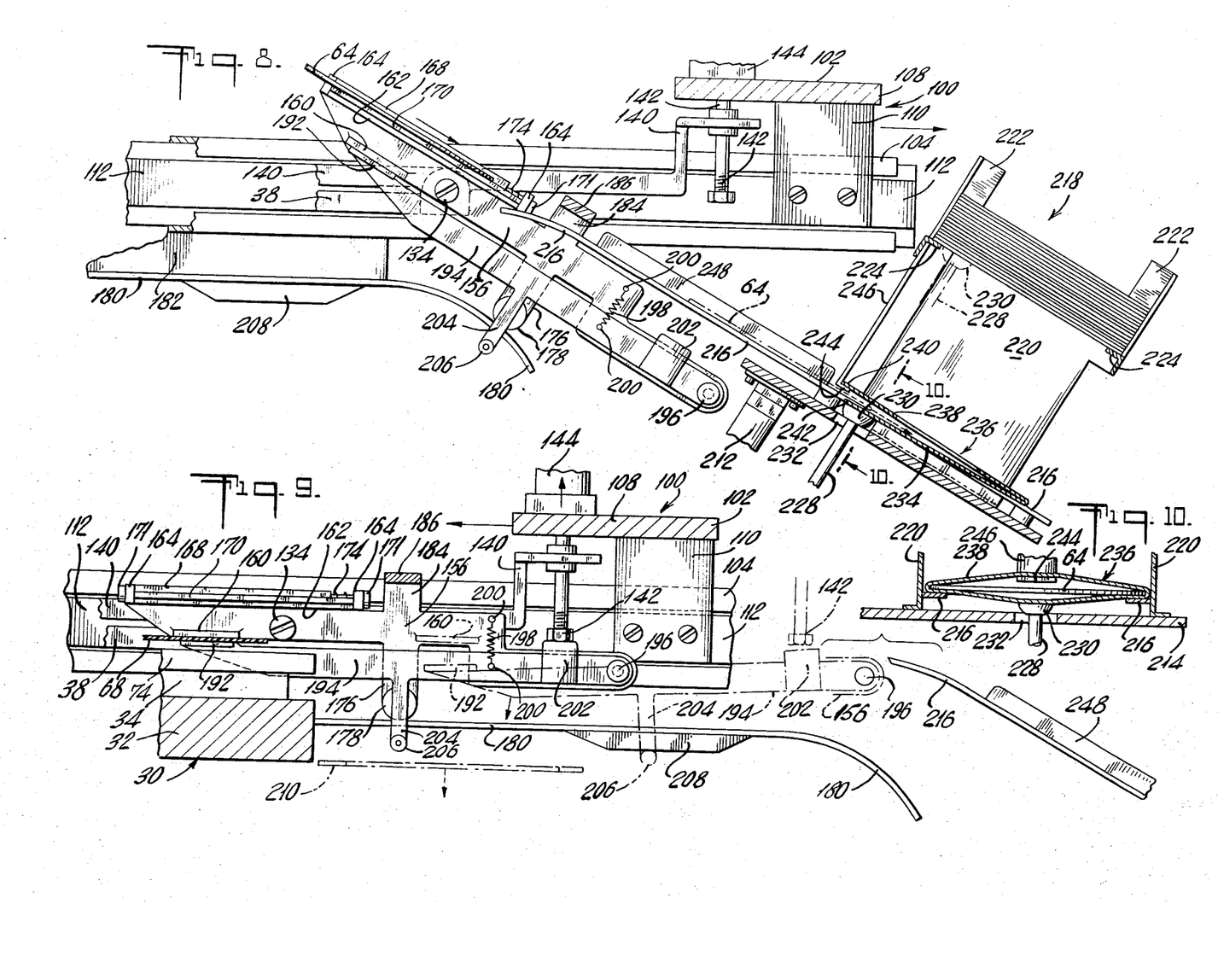
FIG. 8 shows the structure at the right end of FIG. 3 at an enlarged scale in order to illustrate further the details of the structure of the invention in connection with the receiving station.
FIG. 9 is a fragmentary sectional elevation taken along line 9—9 of FIG. 2 in the direction of the arrows illustrating operations in connection with the elimination of flash removed from a trimmed record.
FIG. 10 is a fragmentary transverse sectional elevation taken along line 10—10 of FIG. 8 in the direction of the arrows and illustrating the structure which holds an envelope in a open position for receiving a finished record.

The carriage 102 includes an upper transverse plate 108 having at its end downwardly extending projections 110 one of which is illustrated in FIGS. 8 and 9. These projections 110 are fixed by suitable bolts or the like to a pair of elongated slides 112 which in cross section have the T-shaped configuration shown in FIGS. 11 and 12, for example. The guide rails 104 which extend horizontally and are parallel to each other slidable receive the slide bars 112 in their interior so that these slide bars are guided for horizontal shifting movement in the guide rails of the guide means 106.

Thus, it will be seen that the carriage 102 has a basic frame structure made up of the upper plate 108 and the vertically depending plate portions 110 which are fixed to the pair of slides 112 so that all of this structure moves as a unit along the guide means 106.

Figures 3, 4:
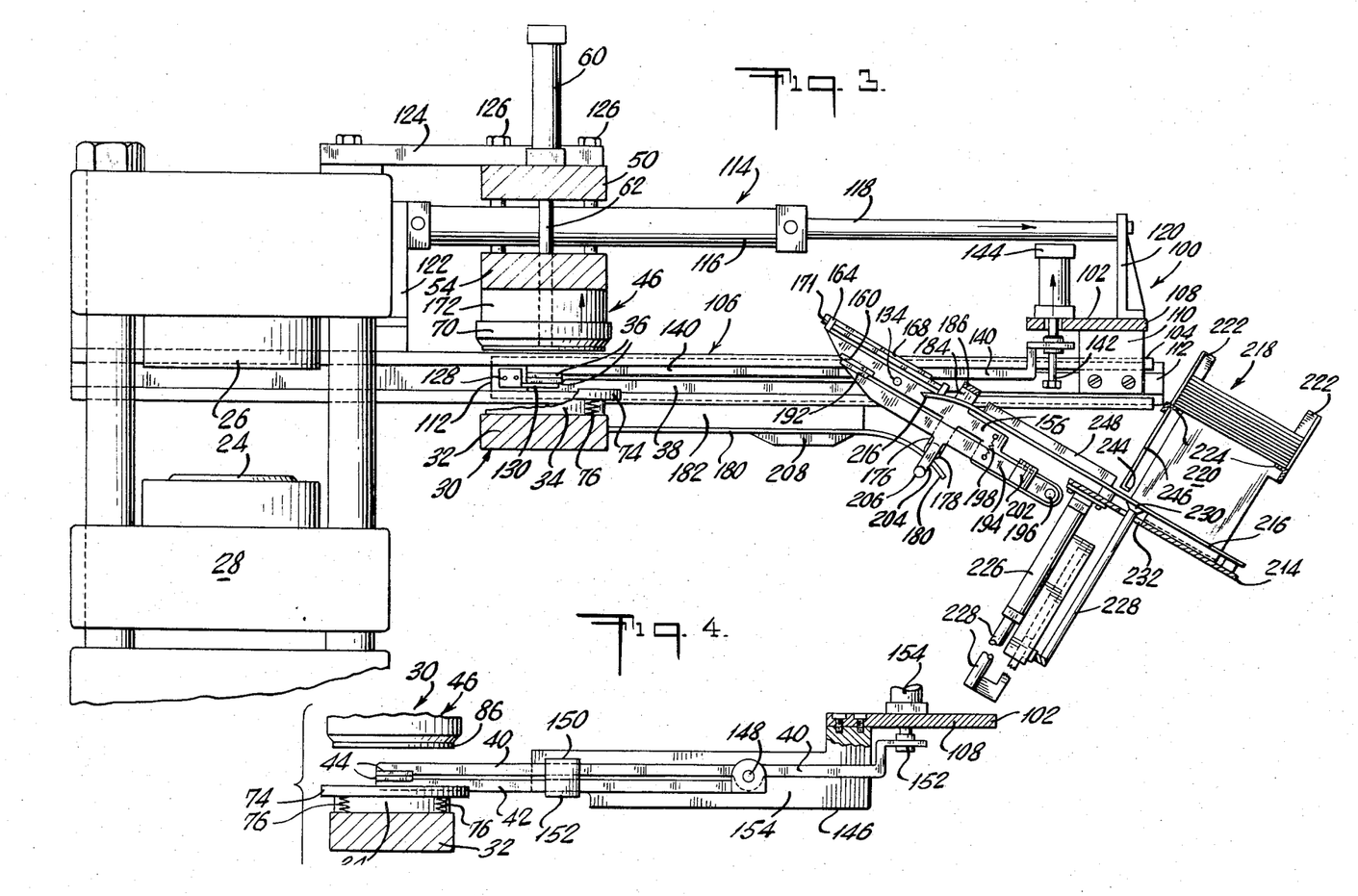
FIG. 3 is a sectional elevation taken along line 3—3 of FIG. 1 in the direction of the arrows.
FIG. 4 is a fragmentary sectional elevation taken along line 4—4 of FIG. 1 in the direction of the arrows.

As may be seen from FIG. 3, a fluid-pressure means 114 is provided for moving the carriage 102 of the transfer means back and forth through its working and return strokes. This fluid pressure means includes a cylinder 116 in which a piston slides, the piston being connected to a piston rod 118 which at its right end, as viewed in FIG. 1, is fixed to a bracket 120 which is in turn fixed to the top surface of the plate 108. The cylinder 116 is in turn supported by a block 122 which is fixed to and extends downwardly from a strap 124 which is fixed by bolts 126 to the top of the beam 50. Through suitable valves air or other fluid under pressure is admitted to the cylinder 116 to bring about the required reciprocation of the rod 118 and the carriage means 102 therewith.

It is to be noted that the guide rails 104 (see FIGS. 2, 3, 5–8, 11, 12) of the guide means 106 are supported at the illustrated elevation where they extend horizontally and are parallel to each other through any suitable frame structure which is not shown.

The pair of slides 112 of the transfer means are mirror images of each other and carry identical assemblies which are mirror images of each other so that only one of these assemblies is described in detail. As may be seen from FIG. 12, each slide member 112 fixedly carries a block 128 provided with a stop portion 130. This stop portion 130 extends beneath the free end of the lever 38 which has been referred to above in connection with FIG. 5. This lever has a gripping projection 36 which has also been referred to above. Thus, the stop 130 fixed to the slide 112 limits the downward movement of the lever 38. This lever 38 is formed at its right end, as viewed in FIG. 12, with an opening 132 which receives a pivot screw 134 which is received in a threaded bore 136 formed in the slide 112. Thus, the lever 38 is free to swing downwardly and rest on the stop 130.

The pivot screw 134 also extends through an opening 138 of a second lever 140 which has an upper projecting portion 36 for gripping the molded record at the flash thereof. This second lever 140 extends rearwardly beyond the pivot 134 and has a rear end portion operatively connected with the plunger 142 of a fluid-pressure means 144 in the form of a suitable pneumatic unit carried by the plate 108 of the carriage means 102, so that when the pneumatic means 144 is actuated to lower the plunger 142 the lever 140 will be swung in a clockwise direction, as viewed in FIG. 12, thus raising the upper gripping projection 36 with respect to the lower gripping projection. This is done when the carriage 102 is shifted along its return stroke back to the starting position shown in FIG. 2, and the elevation of the lower gripping projection 36 is such that it moves beneath the flash of the molded record while the downward movement of the plunger 142 raises the upper projection 36 to an elevation where it moves over the flash of the molded record. Once the carriage 102 has reached its left end position, shown in FIG. 2, at the end of its return stroke, the plunger 142 is raised by the fluid-pressure means 144 so that the upper gripping projection 36 is lowered to bring about gripping of the record at its flash by the pair of gripping projections 36, this being the condition illustrated in FIG. 5 when the transfer means has finished its working stroke and has located the records at the trimming station.

As may be seen from FIG. 4, the plate 108 of the carriage 102 fixedly carries centrally between the pair of guide rails 104 a cantilever supporting plate 146, and this plate carries a pivot pin 148 on which a pair of central levers 40 and 42 are supported for swinging movement. These levers 40 and 42 also have been referred to above in connection with FIG. 5. The plate 146 carries at its front end a stop member 150 of substantially L-shaped configuration. This stop member is fixed at its bottom end through a lower edge 152 of the plate 146 so as to define with the surface 154 of the plate 146, which is visible in FIG. 4, a space in which the levers 40 and 42 are accommodated, with the downward movement of the lever 42 being limited by the stop 150 so that the pair of gripping portions 44 which project in opposite directions from the lever 42 will be situated at the same elevation as the lower gripping projections 36 of the levers 38. At its top end the L-shaped stop 150 is spaced from the surface 154 so that the lever 40 can swing upwardly through this space. At its rear end the lever 40 is operatively connected with a plunger 152 of an intermediate fluid-pressure means 154 which is carried by the plate 108 in the same way as the fluid pressure means 144, and the fluid-pressure means 154 is actuated in the same way as the fluid-pressure means 144, so that the lever 40 is swung in a clockwise direction simultaneously with the lever 140 thus bringing about simultaneous upward movement of the intermediate upper gripping portions 44 which move over the inner parts of the flash at the molding station when the transfer means finishes its return stroke. Then when the plunger 152 moves upwardly, the gripping projections 44 move downwardly to engage the molded records at their inner peripheral flash portions so that the upper gripping portions 36 and the central gripping portions 44 all move downwardly simultaneously in order to grip the records at their flash regions between the gripping portions 36 at their outer peripheries and 44 at their inner peripheries as shown in FIG. 5 and described above.

Of course, it is to be understood that at the other slide 112, shown at the left in FIG. 5, there are levers 38 and 140 identical with those described above and operated in the same way by another fluid-pressure means 144 as indicated schematically at the lower right portion of FIG. 1.

Thus, with the structure as thus far described above, when the carriage means is moved to the left, the gripping portions of the upper levers are moved upwardly so as to move over the flash of the molded records, and then when the plungers 142 and 152 are retracted back to their upper positions, the upper gripping projections move downwardly to grip the records at the gripping portions of the levers so that the records will be transferred to the trimming station in the manner shown in FIG. 5. Of course it is to be understood that once the molded records have been moved away from the molding station and during the interval until the transfer means again reaches the end of its return stroke the molding means 22 operate to mold a second pair of records which are positioned in readiness to again be removed from the molding station in a manner described above. Upon arrival of the pair of records at the trimming station in the position shown in FIG. 5, the pilot pins 62 are lowered through the central openings 66 of the records 64 in order to retain the records at the trimming station during the next return stroke of the transfer means, and at the start of the return stroke the plungers of the fluid-pressure units 144 and 154 are moved downwardly so that the records are no longer gripped and the gripping portions 36 and 44 move forwardly away from the flash of the records while the latter are free to move downwardly along the pilot rods 62 onto the supports 34. Thus, while the pair of records 64 drop downwardly along the pilot rods 62 onto the supports 34 the levers 38 and 140 as well as the levers 40 and 42 are advanced along their return stroke back to the starting position to receive the next pair of molded records.

Figures 11, 12:
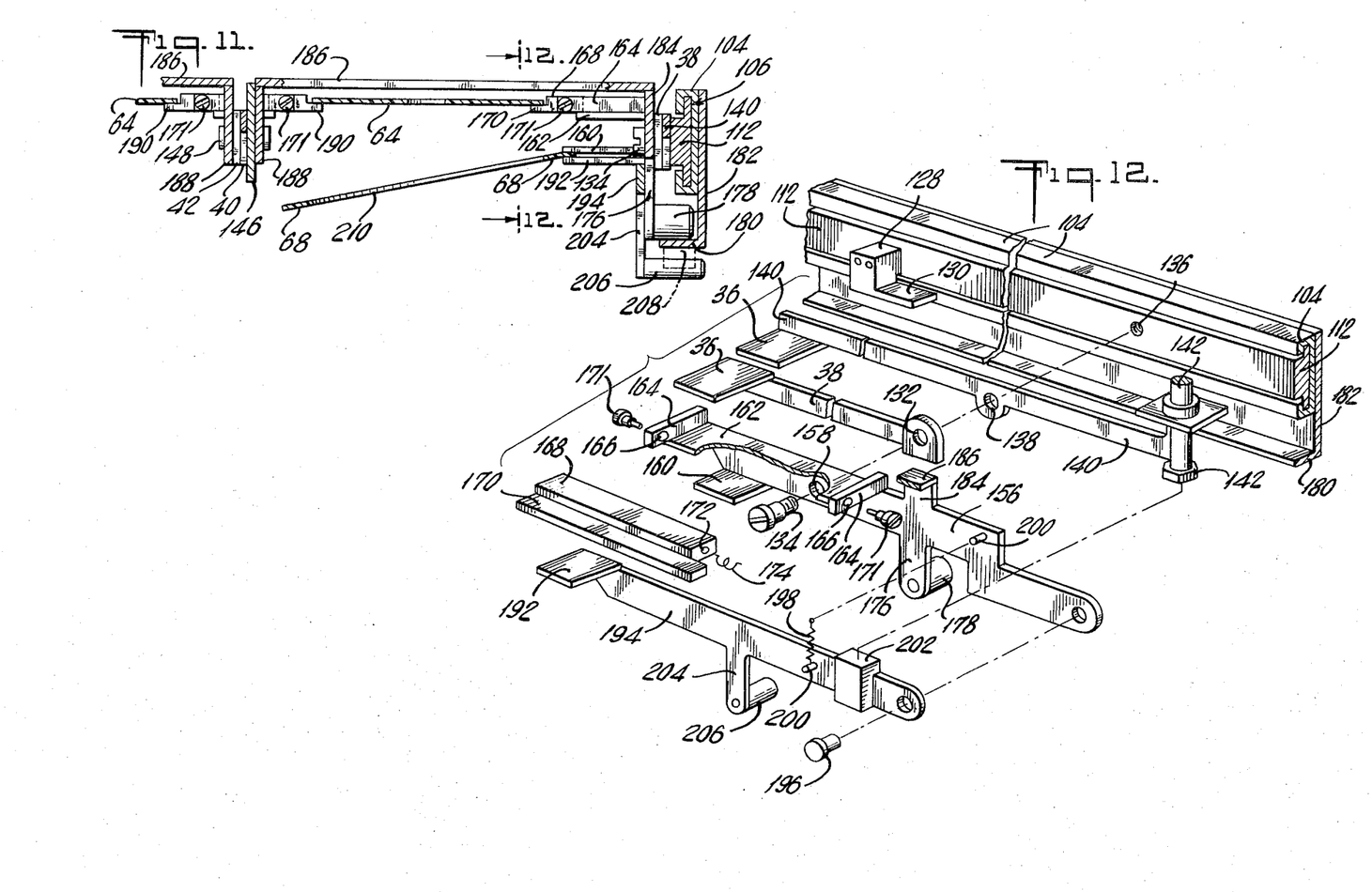
FIG. 11 is a fragmentary transverse sectional elevation taken along line 11—11 of FIG. 2 in the direction of the arrows and showing further details of the structure in connection with flash removal.
FIG. 12 is an exploded fragmentary perspective illustration of the details of the transfer means taken along line 12—12 of FIG. 11 in the direction of the arrows.

The trimming means operate to trim the flash from the records in a manner described above at the trimming station. While the above-described structure of the transfer means moves back to the molding station other structure moves to the trimming station to receive the trimmed records and to remove the flash. This latter structure includes, as shown in FIG. 12 for the structure carried by one of the slides 112, a lever 156 formed with an opening 158 through which the pivot 134 extends so that the lever 156 has the same pivot axis as the levers 38 and 140. This lever 156 carries at its lower front region an upper flash-gripping jaw 160. The lever 156 also has at its upper edge region a horizontal wall portion 162 fixed at its front and rear ends to a pair of upwardly extending flanges 164. These flanges are formed with aligned openings 166. A platform member 168 rests on the wall 162 and has an inner stepped portion 170 forming a shelf for supporting an edge region of a finished record. The openings 166 respectively receive a pair of pivot screws 170 which extend into aligned bores 172 formed in each platform member 168, and springs 174 are situated around the screws 170 and coact with the platforms 168 to urge them in a clockwise direction, as viewed in FIG. 12, to the horizontal position where they support the outer edge regions of the records. Of course this is true of the outer pair of platforms 168. There are an inner pair of platforms which are urged in opposite directions toward a horizontal position for supporting the finished records at their inner edge regions, as described below.

Each lever 156 also has a downwardly extending projection 176 carrying a roller 178 which has rolling contact with the upper surface of a cam 180 fixed to a vertical plate 182 which in turn is fixed to the outer surface of each guide rail 104, as shown in FIG. 11. As is apparent from FIG. 3, the cam 180 is curved downwardly at its right end region for a purpose referred to below.

Each lever 156 has at its rear upper edge region an upwardly extending projection 184 which is fixed to a cross bar 186. FIG. 1 shows the pair of cross bars 186 which extend inwardly toward each other and which are aligned with each other, these cross bars being supported only by the levers 156. At their inner ends which are adjacent to each other the cross bars 186 which are aligned with each other, fixedly carry downwardly extending plates 188. These plates 188 are spaced on opposite sides of the cantilever support plate 146 in the manner shown most clearly at the lower right portion of FIG. 6. The pivot 148 which extends through the pair of levers 40 and 42 in the manner described above in connection with FIG. 4 also extend through the plates 188 so that the latter are supported for turning movement about the same axis as the levers 40 and 42, and this axis coincides with the axis formed by the pair of pivots 134. Thus, the pair of levers 40 and 42 are situated on one side of the cantilever support plate 146, which is the left side thereof, as viewed in FIGS. 6 and 7, with the left plate 188 while the right plate 188 in FIGS. 6 and 7 is situated directly next to the cantilever plate 146. These plates 188 which thus are supported on the one hand by the pivot 148 and on the other hand by the pair of cross bars 186 are provided at their upper front edge regions with projections similar to the projections 164, although they are shorter, and they receive similar screws for supporting a pair of platforms 190 which are capable of turning equally and oppositely to the abovedescribed platforms 168.

These platforms are actuated by the trimming means in such a way that they receive the finished records ejected from the trimming means by the ejecting means in the following manner:

During the downward movement of the trimming dies 70 from the position of FIG. 6 to the position of FIG. 7, the dies not only serve to trim the flash from the records in the manner described above, but in addition they engage the platforms 168 and 190 and tilt them to the condition illustrated in FIG. 7 during actual trimming of the records. As was indicated above, during the upward movement of the beam 54 together with the trimming dies 70, the trimmed records are frictionally held by the dies 70 in the hollow interior 84 thereof until the ejecting means 86 ejects the records from the interiors of the dies 70. By the time the ejecting means reaches the position shown in FIG. 6, the platforms 168 and 170 have been returned to their horizontal positions by the action of the springs 174, so that the ejected records fall onto the horizontal inner ledges or shelves of the platforms 168 and 190, and in this way the finished records are supported on these platforms.

As was indicated above in connection with FIG. 12, each lever 156 has an upper flash-gripping projection 160. The lower flash-gripping projection 192 is carried by and projects from a lever 194 which is pivotally connected by a pivot 196 to the rear end of the lever 156. A spring 198 is connected between pins 200 respectively carried by the levers 156 and 194 so as to urge the upper flash-gripping portion 160 and the lower flash-gripping portion 192 toward each other. The elements 160 and 192 form a second flash-engaging means of the transfer means, this second flash-engaging means serving to engage the trimmed flash and carry the latter away from the trimming station. The levers 194 at each side of the carriage means respectively carry blocks 202 which are respectively engaged by the bottom ends of the plungers 142 of the fluid-pressure means 144 so that when these plungers move downwardly to raise the front upper jaws 36, these plungers simultaneously swing the levers 194 downwardly to lower the flash-gripping jaws 192 away from the upper flash-gripping jaws 160. When these plungers 142 are retracted upwardly for the purpose of causing the flash at the molding station to be gripped between the gripping projections 36, the levers 194 are released to the tensioned springs 198 which pull the levers 194 upwardly around the pivots 196 so that the projections 192 grip the flash trimmed from the records between these projections 192 and the projections 160. As is apparent from FIG. 11, the trimmed ring of flash is held only on one side between the gripping portions 160 and 192. The trimmed ring of flash will clear each support 34 because the rings 74 are displaced upwardly by the springs 76 so as to displace the trimmed flash upwardly from the position of FIG. 7 into the position of FIG. 6 upon return upward movement of the trimming dies 70.

As was indicated above, the levers 156 have rollers 178 which respectively ride along the upper surfaces of the elongated cams 180. On the other hand, the levers 194 have downwardly extending projections 204 which respectively carry rollers 206 which are situated beneath the cams 180. These cams 180 have downwardly extending projecting portions 208 beneath which the rollers 206 ride in order to pull the lower levers 194 downwardly away from the upper levers 156 during operation of the transfer means to transfer the finished records from the trimming station to the receiving station. This action is illustrated most clearly in FIG. 9 which shows how a ring of trimmed flash 210 is dropped upon downward pulling of a lower lever 194 by the camming portion 208 during movement of the carriage means 102 of the transfer means 100 to the right along its working stroke by the fluid-pressure means 114. Thus, once the flash 210 has been displaced beyond the trimming station the cam 208 actuates the flash-gripping projections 192 so as to lower them in opposition to the springs 198 so as to release the flash.

As may be seen from FIG. 1, the flash-ejecting rings 74 have flattened outer peripheral portions 211 in order to clear the front flash-gripping projections 36 which engage the flash of the molded records in order to transfer these records to the trimming station.

Of course, once the rollers 206 move to the right beyond the cams 208 (FIG. 8), the springs 198 again retract the levers 194 upwardly. During the return stroke of the carriage means the cams 208 will again pull the levers 194 downwardly, as shown in phantom lines in FIG. 9, and at this time when the gripping projections 160 and 192 approach the trimming station the plunger 142 will act on the block 202 of each lever 194 in order to hold the lower projections 192 at an elevation low enough to move beneath the trimmed flash, these plungers 142 at the same time raising the front upper jaws 36 for holding them at an elevation sufficient to advance over the flash at the molded records in order to grip the latter as described above.

As is apparent particularly from FIGS. 8 and 9, tilting results from the location of the center of gravity of the unit of the transfer means 100 which is formed by the levers 156 together with the cross bars 186 and the side plates 188 together with all of the structure carried thereby is situated to the right of the axis defined by the pivots 134 and 148. Moreover it will be seen that the cam 180 curves downwardly toward the right at its right portion, as illustrated in FIG. 8. Therefore, during the movement of the transfer means 100 toward the receiving station the roller 178 of each lever 156 will move downwardly along the upper curved right end surface of each cam 180 with the entire unit formed by the levers 156, cross bars 186, levers 194, and all of the structure carried thereby, swinging about the common axis of the pivots 134 and 148, so that this portion of the transfer means assumes the inclined attitude illustrated in FIG. 8. This position of the components is also shown in FIG. 3. As a result the finished records supported on the ledges of the platforms 168 and 190 are free to slide downwardly toward the right, as viewed in FIGS. 3 and 8.

At the receiving station, a framework 212 of any suitable construction supports a stationary plate 214 (FIG. 8), and this stationary plate 214 fixedly carries elongated guiding strips 216 which at their left ends, as viewed in FIGS. 2 and 8, are curved so as to extend beneath the cross bars 186 and so as to engage the rights ends of the platforms 168 and 190 when the transfer means has reached its right end position shown in FIGS. 3 and 8. Thus, at this time the finished records are free to slide downwardly from the platforms 168 and 190 onto the guide strips 216 which continue to guide the finished records downwardly toward the right, as viewed in FIG. 8. It will be noted that at this time the rollers 178 cooperate with the right end regions of the cams 180 to determine the inclination of the platforms.

At each receiving station there is an envelope supply means 218 in the form of a suitable framework 220 also carried by the plate 214. This framework 220 has vertically extending angle members 222 which receive the corners of the envelopes. The bottom envelope of each stack rests on the hoizontal projections 224 in the manner shown most clearly in FIGS. 3 and 8.

The framework 212 carries at each receiving station a cylinder 226 in which a plunger is capable of reciprocating, this plunger carrying the elongated rod 228 which terminates at its top end in a suction cup 230. Air is supplied under suitable pressure and at a suitable time to each cylinder 226 in order to advance the rod 228 upwardly through an opening 232 formed in the supporting plate 214. At the end of its upward movement the suction cup 230 engages the lower sheet portion 234 of the lowermost envelope 236 of the stack of envelopes at the supply means 218. Due to the suction of the suction cup 230, the return downward stroke of the rod 228 causes the lowermost envelope of each stack to be pulled downwardly below the projection 224, and the upper sheet 238 of each envelope trails behind lower sheet 234 and projects at its left edge 240, shown in FIG. 8, beyond the edge 242 of the lower sheet portion 234 of each envelope. Thus, preopening of the envelopes is provided. The supply means 218 includes (FIG. 10) an inwardly extending projection 244 which engages the front edge 240 to prevent it from continuing to move downwardly with the front edge 242 of the lower sheet portion 234. As a result each envelope is automatically preopened and has its entrance opening situated in line with path of movement of each record which slides down the guide strips 216, so that in this way each record will slide automatically into an envelope 236. The impact of each finished record sliding into the open envelope 236 may not be sufficient to separate the envelope from the suction cup 230. To assure separation, the vacuum in the suction cup may be mechanically broken at the proper instant in any suitable way so that envelopes with finished records automatically slide downwardly away from the receiving station to be received in a suitable collecting box.

As is apparent from FIG. 10, at the receiving station the supply means has a rearwardly extending projection 244 projecting from a strip 246 and centrally engaging the front projecting edge 240 of each envelope in a manner shown most clearly in FIG. 10.

During the return stroke of the transfer means 100 the rods 228 are again displaced upwardly to engage the next envelope of each stack with the suction cups 230 in order to lower these envelopes and hold their entrance ends open by way of the projections 244 so that envelopes are maintained in readiness to receive the finished records which slide down the strips 216 when the transfer means again reaches the right end of its working stroke. Of course, during the return stroke the cams 180 coact with the rollers 178 in order to return the swingable portions of the transfer means back to the horizontal positions where the platforms will again receive the next finished records in a manner described above.

As is apparent from FIGS. 3, 8, and 9, the guide strips 216 are provided at their outer side edges with upwardly extending flanges 248 which prevent the finished records from sliding laterally and compel them to slide in a straight path down into the open envelopes 236.

It is thus apparent from the above description that with the structure of the invention a relatively simple apparatus is capable of operating in a fully automatic manner in order to transfer records from a molding station to a trimming station while simultaneously transferring finished records from the trimming station to a receiving station where the finished records are automatically received in envelopes. During the return stroke of the transfer means 100 the molding operations in connection with the next pair of records are being completed and the same is true of the trimming operations at the trimming station while at the receiving station the next pair of envelopes are displaced to a position for receiving the next pair of finished records. As a result of all of these operations which are carried out in proper timed sequence an extremely high output is achieved with the relatively simple automatic apparatus of the invention.

What is claimed is:

1. In a machine for manufacturing disc records, molding means situated at a molding station for molding records with flash projecting circumferentially therefrom, trimming means situated at a trimming station for trimming flash from a molded record, receiving means situated at a receiving station for receiving a finished record from which the flash has already been trimmed by said trimming means, and transfer means movable between said stations for transferring a molded record from said molding station to said trimming station and for simultaneously transferring a trimmed record from said trimming station to said receiving station, guide means coacting with said transfer means for guiding the latter in one direction along a working stroke during which said transfer means transfers a record from said molding station to said trimming station and a trimmed record from said trimming station to said receiving station, and said guide means guiding said transfer means for movement in an opposite direction along a return stroke back to a starting position for receiving the next molded record and the next trimmed record, said trimming means including a support for receiving a record transferred from said molding station to said trimming station by said transfer means, said trimming means also including a circular trimming die for acting on a record on said support for trimming flash therefrom during movement of said trimming die with respect to said support, said transfer means having a first flash-engaging means for engaging flash extending circumferentially from a molded record at said molding station to support the molded record during transfer thereof from said molding station to said trimming station, and said transfer means also having a second flash-engaging means for engaging a ring of trimmed flash trimmed from a record at said trimming station by said circular trimming die, said transfer means coacting with said trimming means at said trimming station for receiving with said second flash-engaging means the ring of flash trimmed from a record for removing the trimmed flash from said trimming station, said first flash-engaging means releasing a molded record at said trimming station at the end of said working stroke and said second flash-engaging means releasing the trimmed ring of flash after removal thereof from the trimming station during movement of said transfer means along said working stroke, and both of said flash-engaging means returning with said transfer means along the return stroke thereof for respectively engaging the flash circumferentially projecting from the next molded record at the molding station and the ring of flash trimmed from the next molded record delivered at the trimming station during the previous working stroke of said transfer means.

2. The combination of claim 1 and wherein an envelope supply means is located at said receiving station for supplying thereto envelopes for respectively receiving finished records, said supply means operating on envelopes at said receiving station for supplying the envelopes one after the other in an open condition for automatically receiving records successively delivered to said receiving station by said transfer means so that each completed record is automatically situated in an envelope.

3. The combination of claim 1 and wherein said molding means molds a pair of records simultaneously at said molding station and wherein said trimming means simultaneously trims a pair of records at said trimming station, said transfer means simultaneously transferring the pair of records from said molding station to said trimming station and the pair of trimmed records from said trimming station to said receiving station.

4. The combination of claim 1 and wherein said trimming die frictionally engages a trimmed record at its periphery and displaces the trimmed record away from said support and said trimming means including an ejecting means for ejecting a trimmed record from said die, said transfer means receiving the ejected record from said trimming die and transferring the finished trimmed record from said trimming die to said receiving station.

5. The combination of claim 4 and wherein a record molded at said molding station has a central opening, said trimming means including a pilot pin which extends through said central opening of a record for guiding the latter onto said support when the record is released with the flash thereon at said trimming station by said transfer means, and said trimming means including a central punch for punching a central opening in the record simultaneously with the trimming of flash therefrom by said trimming die.

6. The combination of claim 1 and wherein said transfer means includes a carriage guided by said guide means for movement along said working and return strokes, said carriage having pairs of gripping levers provided with gripping projections forming part of said first flash-engaging means and lever-operating means coacting with said levers for actuating the latter to grip a molded record at the flash located at the periphery thereof with one set of gripping projections, said lever-operating means coacting with the latter levers for releasing a record when it arrives at said trimming station, and said transfer means including platforms on which a trimmed record is deposited by said trimming means so that said platforms support a finished record resting thereon during transfer of the finished record from said trimming station to said receiving station.

7. The combination of claim 6 and wherein said transfer means includes a swingable portion carrying said platforms and cam means coacting with said swingable portion for swinging the latter to an angular attitude where a finished record slides downwardly from said platforms to said receiving station.

8. The combination of claim 7 and wherein a supply means is located at said receiving station for supplying envelopes which are respectively to receive finished records, said supply means supplying the envelopes one by one to the path along which each finished record slides upon tilting of said swingable portion of said transfer means by said cam means, and said supply means holding an open end of each envelope in an open position to receive automatically a record which slides from said swingable portion of said transfer means.

9. The combination of claim 7 and wherein said transfer means has levers and gripping projections thereon forming part of said second flash-engaging means for gripping flash trimmed from each record at said trimming station, the trimmed flash being transferred with said transfer means from said trimming station during transfer of a finished record from said trimming station to said receiving station, and cam means coacting with the latter levers for spreading the gripping projections thereof apart to drop the flash at a predetermined point during travel of said transfer means from said trimming station to said receiving station.

10. The combination of claim 1 and wherein, said molding means at said molding station and said trimming means at said trimming station operate for respectively molding and trimming records during movement of said transfer means along said return stroke thereof, said molding station, trimming station, and receiving station being arranged one after the other along a straight line and said transfer means moving along a straight path through said working stroke and return stroke.

* * * * *